(12) United States Patent
Maze et al.

(10) Patent No.: US 7,081,157 B2
(45) Date of Patent: Jul. 25, 2006

(54) USE OF MOO₃ AS CORROSION INHIBITOR, AND COATING COMPOSITION CONTAINING SUCH AN INHIBITOR

(75) Inventors: Etienne Maze, Clermont (FR); Carmen Mocquery, Creil (FR); Benoit Millet, Saint Witz (FR); Antonio Francisco Iandoli Espinosa, Sao Paulo (BR)

(73) Assignee: Dacral, Creil (FR)

( * ) Notice: Subject to any disclaimer, the term of this patent is extended or adjusted under 35 U.S.C. 154(b) by 0 days.

(21) Appl. No.: 10/416,375

(22) PCT Filed: Nov. 12, 2001

(86) PCT No.: PCT/IB01/02764

§ 371 (c)(1),
(2), (4) Date: May 12, 2003

(87) PCT Pub. No.: WO02/38686

PCT Pub. Date: May 16, 2002

(65) Prior Publication Data

US 2004/0142162 A1 Jul. 22, 2004

(30) Foreign Application Priority Data

Nov. 13, 2000 (FR) .................................. 00 14534

(51) Int. Cl.
*C09D 5/08* (2006.01)
*C23F 11/18* (2006.01)
(52) U.S. Cl. ............................ 106/14.21; 106/14.41; 106/14.44; 252/389.31; 252/389.54
(58) Field of Classification Search ............ 106/14.21, 106/14.41, 14.44; 427/387, 421, 435; 252/389.54, 252/389.31
See application file for complete search history.

(56) References Cited

U.S. PATENT DOCUMENTS

| | | | | |
|---|---|---|---|---|
| 3,248,251 A | * | 4/1966 | Allen | 428/559 |
| 3,827,140 A | * | 8/1974 | Yamagishi et al. | 228/199 |
| 3,874,883 A | * | 4/1975 | Robitaille et al. | 106/14.21 |
| 3,917,648 A | * | 11/1975 | McLeod | 524/364 |
| 4,277,284 A | * | 7/1981 | Ginsberg et al. | 106/1.05 |
| 4,305,979 A | * | 12/1981 | Isarai et al. | 427/386 |
| 4,459,155 A | | 7/1984 | Cayless | |
| 4,731,295 A | | 3/1988 | Yamamoto et al. | |
| 5,868,819 A | | 2/1999 | Guhde et al. | |
| 6,270,884 B1 | * | 8/2001 | Guhde et al. | 428/323 |
| 6,610,407 B1 | * | 8/2003 | Homi | 428/416 |

FOREIGN PATENT DOCUMENTS

| | | | | |
|---|---|---|---|---|
| CA | 1182720 | A | * | 2/1985 |
| EP | 147273 | A | * | 11/1983 |
| GB | 2091235 | A | | 7/1982 |
| JP | 05044090 | A | * | 2/1993 |
| JP | 06-100803 | A | | 7/1994 |
| JP | 08-060039 | A | * | 3/1996 |

OTHER PUBLICATIONS

Derwent Abstract No. 1985-068578, abstract of Canadian Patent Specification No. 1182720 (Feb. 1985).*

* cited by examiner

*Primary Examiner*—Anthony J. Green
(74) *Attorney, Agent, or Firm*—Wood, Philliips, Katz, Clark & Mortimer

(57) ABSTRACT

The subject matter of the invention is the use of $MoO_3$ as a corrosion coating composition for metal parts, characterized in that it comprises: a least one particulate metal; an organic solvent; a thickener; a silane-based binder, preferably carrying epoxy functional groups; molybdenum oxide ($MoO_3$); possibly a silicate of sodium, potassium or lithium; and water.

18 Claims, 1 Drawing Sheet

USE OF MOO₃ AS CORROSION INHIBITOR, AND COATING COMPOSITION CONTAINING SUCH AN INHIBITOR

The object of the present invention is to develop an anti-corrosion coating for metal parts, preferably a coating free of hexavalent chromium, which is endowed with improved anti-corrosion properties.

The invention applies to metal parts of any type, in particular made of steel or cast iron, which need to have good corrosion behaviour, for example because of their application in the motor-vehicle industry. The geometry of the parts to be treated is of little importance as long as the anti-corrosion compositions may be applied by reliable and industrializable processes.

One of the objects of the present invention is in particular to improve the anti-corrosion properties of parts treated without using a composition based on hexavalent chromium in the formulation of the coatings.

Many anti-corrosion treatment solutions based on hexavalent chromium have been proposed to date. Although they are generally satisfactory with regard to the protection of treated metal parts, they are, however, becoming increasingly criticized because of their consequences with regard to the toxic risks that they entail and in particular because of their adverse consequences for the environment.

As a consequence, various anti-corrosion treatment compositions free of hexavalent chromium have been recommended. Some of these compositions are based on a particular metal, such as zinc or aluminium. However, when such compositions are in the form of an aqueous dispersion their stability is limited. This precludes long preservation and storage times.

Within the context of the present invention, the Applicant has discovered that it is possible to improve the anti-corrosion properties and the stability of various anti-corrosion coating compositions by incorporating thereinto molybdenum oxide $MoO_3$ as corrosion inhibitor.

Hitherto, the use of molybdenum oxide $MoO_3$ as a corrosion inhibitor in systems of aqueous phase has not been known. Certain molybdates, i.e. $MoO_4^{2-}$ ions, have already been presented as corrosion inhibitors. However, the Applicant has been able to show that in a certain number of conventional anti-corrosion compositions the addition of a molybdate, for example zinc molybdate, in no way improves its properties.

The present invention relates more particularly to the use of molybdenum oxide $MoO_3$ as an agent for enhancing the anti-corrosion properties of a coating composition based on a particulate metal containing zinc or a zinc alloy in aqueous phase. This finding has even been extended to composition containing hexavalent chromium. This is another object of the invention.

Without in any way wishing to be limited to such an interpretation, it seems that in the particular case of an anti-corrosion coating composition based on a particulate metal, the presence of molybdenum oxide $MoO_3$ makes it possible to improve the control of the sacrificial protection exerted by the particulate metal in suspension in the composition.

According to one particular feature, the particulate metals have a lamellar form, the thickness of the flakes being comprised between 0.05 μm and 1 μm and having a diameter equivalent ($D_{50}$) measured by laser diffraction comprised between 5 μm and 25 μm the subject of the invention is more particularly the use of molybdenum oxide $MoO_3$ in a composition containing zinc in aqueous phase.

According to another feature of the invention, the molybdenum oxide $MoO_3$ is used in an essentially pure orthorhombic crystalline form, having a molybdenum content greater than approximately 60% by mass.

Advantageously, the molybdenum oxide $MoO_3$ will be used in the anti-corrosion compositions in the form of particles having dimensions of between 1 and 200 μm.

More specifically, the subject of the present invention is anti-corrosion coating compositions for metal parts, which comprise:
- at least one particulate metal;
- an organic solvent;
- a thickener;
- a silane-based binder, preferably carrying epoxy functional groups;
- molybdenum oxide ($MoO_3$);
- possibly a silicate of sodium, potassium or lithium, and;
- water.

The relative proportions of the various constituents in such a composition may vary widely. However, it has turned out that the content of molybdenum oxide $MoO_3$ is preferably between 0.5 and 7% and even more preferably in the region of 2% by weight of the total composition.

The particulate metal present in the composition may be chosen from zinc, aluminium, chromium, manganese, nickel, titanium, their alloys and intermetallic compounds, and mixtures thereof. It should be pointed out here that if the recommended coating composition is preferably free of $Cr^{VI}$, it may nevertheless contain a certain proportion of metallic chromium. In practice, it has turned out that the presence of zinc is highly desirable.

Advantageously, the particulate metal content is between 10% and 40% by weight of metal with respect to the weight of the composition.

Preferably, the anti-corrosion coating composition according to the invention contains zinc and/or aluminium, and preferably comprises zinc.

As indicated above, this type of composition is mainly of aqueous nature and therefore preferably contains from 30% to 60% by weight of water. The composition may nevertheless be enriched by the presence of an organic solvent, preferably a water-soluble organic solvent, which makes it possible to improve the anti-corrosion performance of the composition. For this purpose, the composition will contain, for example, from 1% to 30% by weight with respect to the total composition. However, it seems to be important not to exceed this organic solvent content of approximately 30%.

In an advantageous embodiment of the invention, the composition will make use of an organic solvent, for example consisting of a glycol ether, in particular diethylene glycol, triethylene glycol and dipropylene glycol.

According to another feature of the present invention, the anti-corrosion composition also contains from 0.005% to 2% by weight of a thickening agent, in particular of a cellulose derivative, more particularly hydroxymethylcellulose, hydroxyethylcellulose, hydroxypropylcellulose, hydroxypropylmethylcellulose, xanthan gum or an associative thickener of the polyurethane or acrylic type.

The composition of the present invention may also contain mineral rheologic agents of the silica or organophilic clays type.

Such a composition also makes use of a binder, preferably an organofunctional silane, used in an amount of 3% to 20% by weight. The organofunctionality can be represented by vinyl, methacryloxy and amino, but is preferably epoxy functional for enhanced coating performance as well as composition stability. The silane is advantageously easily dispersible in aqueous medium, and is preferably soluble in such medium.

Preferably, the useful silane is an epoxy functional silane such as beta-(3,4-epoxycyclohexyl) ethyltrimethoxysilane, 4(trimethoxysilyl) butane-1,2 epoxide or γ-glycidoxypropyltrimethoxysilane.

Finally, the anti-corrosion coating compositions according to the invention may also contain, in addition to the aforementioned organic solvent, up to a maximum amount of approximately 10% by weight of white spirit so as to improve the ability of the anti-corrosion compositions to be applied to the metal parts by spraying, dipping or dip-spinning.

Advantageously, the composition may also contain a silicate of sodium, potassium or lithium, preferably in an amount comprised between 0.05% to 0.5% by weight.

Naturally, the present invention also relates to anti-corrosion coatings which are applied to the metal parts using the aforementioned compositions, being applied by spraying, spinning or dip-spinning followed by a curing operation at a temperature of between 70° C. and 350° C. for a cure time of around 30 minutes.

According to an advantageous embodiment, the anti-corrosion coating will result from an application operation involving, prior to the curing operation, an operation of drying the coated metal parts, preferably at a temperature of around 70° C. for approximately 20 minutes. Under these conditions, the thickness of the coating thus applied is between 3 μm and 15 μm and preferably between 5 μm and 10 μm.

Figure 1:
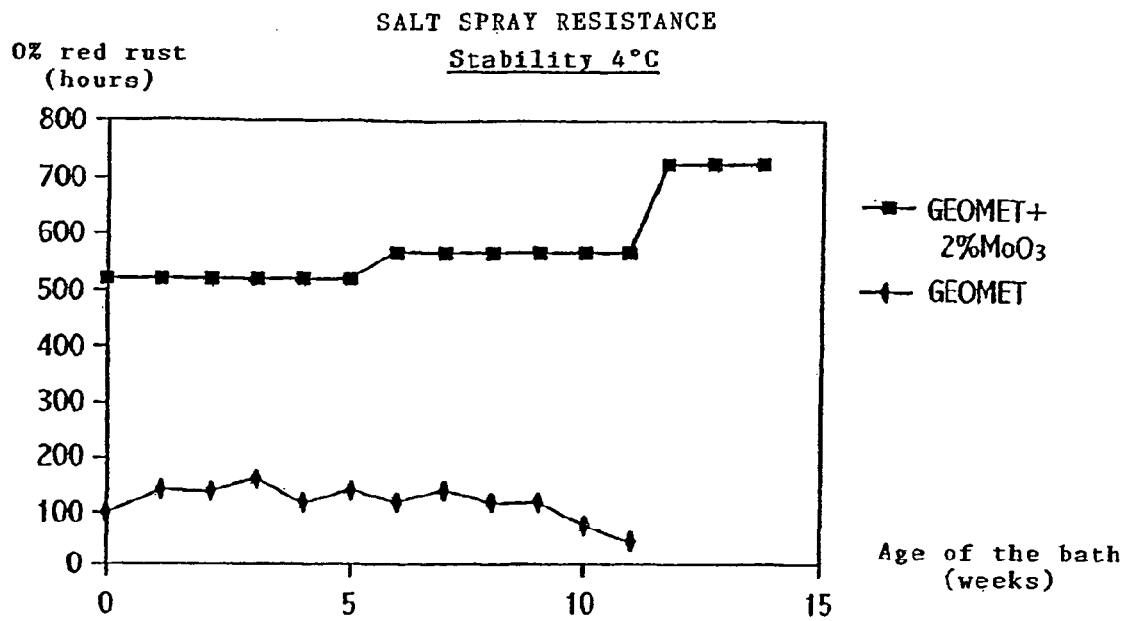
FIGS. 1 and 2, respectively, are graphs of salt spray resistance, as a function of bath age, in the examples presented herein below.

In the examples presented hereinbelow for comparative purposes, various types of corrosion inhibitor were tested within the context of the present study, which was carried out in order to improve the anti-corrosion properties of various compositions and in particular of the reference composition called GEOMET® which has been described in U.S. Pat. No. 5,868,819 herein incorporated by reference.

These were the main commercially available corrosion inhibitors. They have been listed below by broad chemical category, specifying each time the origin of the product together with its name and its composition.

| Modified zinc phosphates: | |
|---|---|
| Supplier: Heubach: | |
| HEUCOPHOS ® ZPA: | hydrated zinc aluminium orthophosphate |
| HEUCOPHOS ® ZMP: | hydrated zinc molybdenum orthophosphate |
| HEUCOPHOS ® SAPP: | hydrated strontium aluminium polyphosphate (SrO: 31%; $Al_2O_3$: 12%; $P_2O_5$: 44%; $MgSiF_6$: 0.3%) |
| HEUCOPHOS ® SRPP: | hydrated strontium aluminium polyphosphate (SrO: 28%; $Al_2O_3$: 12%; $P_2O_5$: 42%) |
| HEUCOPHOS ® ZCP: | hydrated zinc calcium strontium silicate orthophosphate |
| HEUCOPHOS ® ZCPP: | hydrated zinc calcium aluminium strontium silicate orthophosphate (ZnO: 37%; SrO: 5%; $Al_2O_3$: 3%; $P_2O_5$: 18%; CaO: 14%; $SiO_2$: 14%) |
| HEUCOPHOS ® CAPP: | hydrated calcium aluminium silicate polyphosphate ($Al_2O_3$: 7%; $P_2O_5$: 26%; CaO: 31%; $SiO_2$: 28%) |
| Supplier: Devineau: | |
| ACTIROX ® 213: | zinc iron phosphates (ZnO: 66%; $PO_4$: 48%; $Fe_2O_3$: 37%) |
| Supplier: Lawrence Industries: | |
| HALOX ® SZP 391: | zinc calcium strontium phosphosilicate |
| HALOX ® CZ 170: | zinc orthophosphate |
| Supplier: Tayca: | |
| K WHITE ® 84: | aluminium triphosphate (ZnO: 26.5 to 30.5%; $Al_2O_3$: 9 to 13%; $P_2O_5$: 36 to 40%; $SiO_2$: 11 to 15%) |
| | Molybdates |
| Supplier: Devineau: | |
| ACTIROX ® 102: | zinc molybdates coupled to zinc-phosphate-modified agents (ZnO: 63%; $PO_4$: 46%; $MoO_3$: 1%) |
| ACTIROX ® 106: | zinc molybdates coupled to zinc-phosphate-modified agents (ZnO: 67%; $PO_4$: 46%; $MoO_3$: 1%) |
| Supplier: Sherwin Williams: | |
| MOLY WHITE ® MAZP | ZnO, $CaCO_3$, $Zn_3(PO_4)_2$, $CaMoO_4$ |
| MOLY WHITE ® 212: | ZnO, $CaCO_3$, $CaMoO_4$ |
| Sodium molybdate: | $Na_2MoO_4$ |
| | Borates |
| Supplier: Buckman: | |
| BUTROL ® 23: | calcium metaborate |
| BUSAN ® 11M2: | barium metaborate |
| Supplier: Lawrence Industries: | |
| HALOX ® CW 2230: | calcium borosilicate |
| | Calcium-doped silica |
| Supplier: Grace: | |
| SHIELDEX ® AC5 | |
| | Zinc salts |
| Supplier: Henkel: | |
| ALCOPHOR ® 827: | organic zinc salt |
| | Organic inhibitors |
| Supplier: Ciba-Geigy: | |
| IRGACOR ® 1930: | complex of zirconium and 4-methyl-γ-oxobenzenebutanoic acid |
| IRGACOR ® 1405: | 4-oxo-4-p-tolybutyric acid with 4-ethylmorpholine |
| CGCI ® (IRGACOR 287): | polymeric amine salts |
| Supplier: Lawrence Industries: | |
| HALOX FLASH ® X: | boric acid, phosphoric acid, triethanolamine salts, 2-dimethyl-aminoethanol |
| | Zinc passivators |
| Supplier: Ciba-Geigy: | |
| IRGAMET ® 42: | 2,2 [[(5-methyl-1H-benzotriazol-1-yl)methyl]imino]bisethanol |
| IRGAMET ® BTA M: | 1H-benzotriazole. |

EXAMPLE 1

The standard reference GEOMET® composition corresponds to:

| | |
|---|---|
| Deionized water | 38.60% |
| DPG | 10.29% |
| Boric acid | 0.65% |
| SYMPERONIC ® NP4 | 1.51% |
| SYMPERONIC ® NP9 | 1.64% |
| SILQUEST ® A187 | 8.66% |
| Zinc* | 32.12% |
| Aluminium** | 5.08% |
| SCHWEGO FOAM ® | 0.4% |
| NIPAR ® S10 | 0.71% |
| AEROSOL ® TR70 | 0.53% |

*Lamellar zinc in the form of an approximately 95% paste in white spirit: zinc 31129/93 of ECKART WERKE;
**Lamellar aluminium in the form of an approximately 70% paste in DPG: CHROMAL VIII ® of ECKART WERKE.

To carry out the various comparative experiments on the aforementioned inhibitors, different baths were obtained by adding 1 g of inhibitor to 9 ml of water, the dispersion being maintained for 1 hour, then the mixture was added to 90 g of the aforementioned standard GEOMET® composition and then stirred for 3 hours.

The first layer of this composition to be tested was applied using a No. 38 Conway bar. The drying was carried out at 70° C. for approximately 20 minutes and then the curing was carried out at 300° C. for approximately 30 minutes.

The second layer was applied using an identical protocol.

The panels thus treated were then tested in a salt spray. The salt spray resistance results for the various coatings tested are given in the table below.

TABLE 1

| Nature of the inhibitor | Name of the inhibitor | in salt spray without red rust |
|---|---|---|
| Reference | GEOMET | 112 |
| Modified zinc phosphates | GEOMET + ZPA | 134 |
| | GEOMET + ZMP | 122 |
| | GEOMET + SAPP | 66 |
| | GEOMET + SRPP | 66 |
| | GEOMET + ZCP | 66 |
| | GEOMET + ZCPP | 88 |
| | GEOMET + CAPP | 66 |
| | GEOMET + ACTIROX 213 | 66 |
| | GEOMET + HALOX 391 | 66 |
| | GEOMET + K WHITE 84 | 88 |
| Molybdates | GEOMET + ACTIROX 102 | 66 |
| | GEOMET + ACTIROX 106 | 88 |
| | GEOMET + MW 212 | 88 |
| | GEOMET + MW MZAP | 88 |
| | GEOMET + $Na_2MoO_4$ | 66 |
| Borates | GEOMET + BUTROL | 44 |
| | GEOMET + BUSAN | 112 |
| | GEOMET + HALOX 2230 | 66 |
| Various | GEOMET + SHIELDEX | 112 |
| | GEOMET + ALCOPHOR 827 | 66 |
| | GEOMET + IRGACOR 1930 | 88 |
| | GEOMET + IRGACOR 1405 | 88 |
| | GEOMET + CGCI | 88 |
| | GEOMET + HALOX FLASH X | 66 |
| | GEOMET + IRGAMET 42 | 44 |
| | GEOMET + IRGAMET BTAM | 66 |
| Invention | GEOMET + $MoO_3$* | 518 |

*$MoO_3$: POR from CLIMAX Company

Figure 2:
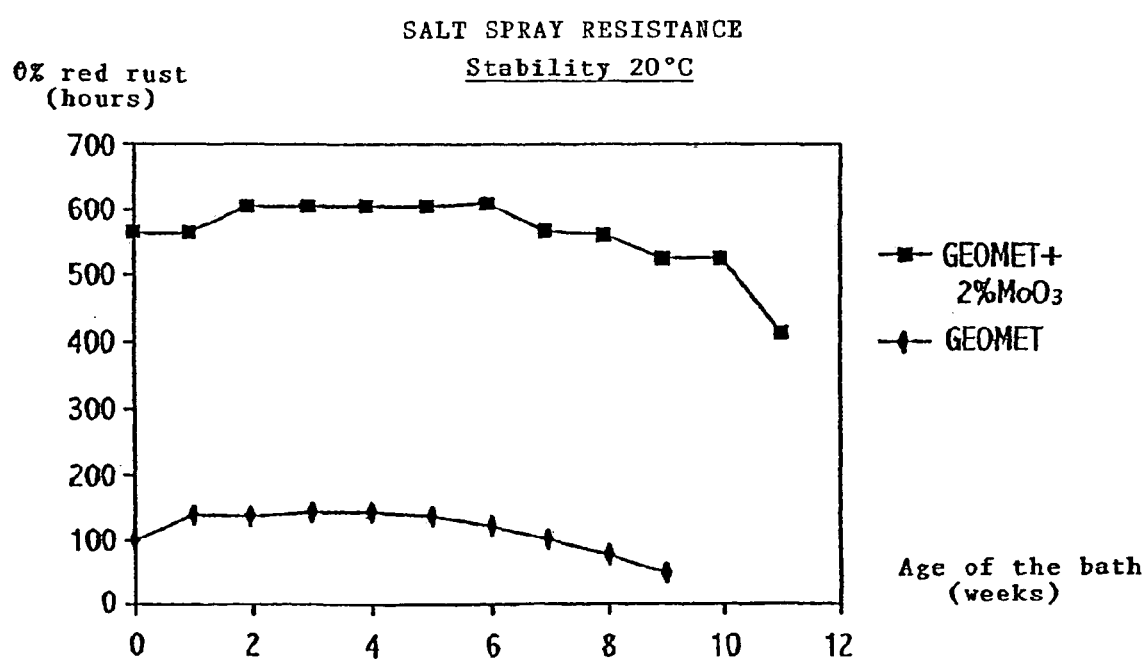

In addition, the more particular salt spray resistance results as a function of the age of the bath, and therefore of its stability at 4° C. and 20° C. respectively, are given in the appended FIGS. 1 and 2.

Both these figures show very clearly that, in each case, on the one hand, the anti-corrosion performance of the composition containing molybdenum oxide $MoO_3$ is markedly improved and that, on the other hand, the anti-corrosion performance is maintained better over time when molybdenum oxide is added to the composition.

EXAMPLE 2

Two other types of comparative experiments were carried out, one on a GEOMET® composition and the other on a DACROMET® composition based on hexavalent chromium.

The formulations of these compositions are given in the tables below.

TABLE 2

| | GEOMET ® | |
|---|---|---|
| Raw materials | Concentrations in % without $MoO_3$ | Concentrations in % with $MoO_3$ |
| Deionized water | 38.60 | 37.83 |
| DPG | 10.29 | 10.08 |
| Boric Acid | 0.65 | 0.64 |
| SYMPERONIC NP4 ® | 1.51 | 1.48 |
| SYMPERONIC NP9 ® | 1.64 | 1.61 |
| SILQUEST ® A187 | 8.66 | 8.47 |
| Zinc* | 32.12 | 31.48 |
| Aluminium** | 5.08 | 4.98 |
| SCHWEGO FOAM ® | 0.4 | 0.21 |
| NIPAR ® S10 | 0.71 | 0.70 |
| AEROSOL ® TR70 | 0.53 | 0.52 |
| $MoO_3$*** | 0 | 2 |

*Lamellar zinc in the form of an approximately 95% paste in white spirit: Zinc 31129/93 of ECKART WERKE;
**Lamellar aluminium in the form of an approximately 70% paste in DPG: CHROMAL VIII ® of ECKART WERKE.
***$MoO_3$: POR from CLIMAX Company
SYMPERONIC ®: nonionic surfactants
SILQUEST ® A187: γ-glycidoxypropyltrimethoxysilane
SCHWEGO FOAM ®: hydrocarbon-type antifoam
NIPAR ® S10: nitropropane
AEROSOL ® TR70: anionic surfactant.

TABLE 3

| | DACROMET ® | |
|---|---|---|
| Raw materials | Concentrations in % without $MoO_3$ | Concentrations in % with $MoO_3$ |
| Deionized water | 47.86 | 44.90 |
| DPG | 15.95 | 15.63 |
| PGME acetate | 1.56 | 1.53 |
| Chromic acid | 3.81 | 3.73 |
| REMCOPAL ® 334 | 0.72 | 0.71 |
| REMCOPAL ® 339 | 0.72 | 0.71 |
| Zinc* | 23.61 | 23.14 |
| Aluminium** | 3.06 | 3.00 |
| Boric acid | 1.30 | 1.27 |

TABLE 3-continued

DACROMET ®

| Raw materials | Concentrations in % without MoO₃ | Concentrations in % with MoO₃ |
| --- | --- | --- |
| ZnO | 1.41 | 1.38 |
| MoO₃*** | 0 | 2 |

*Lamellar zinc in the form of an approximately 95% paste in white spirit: Zinc 31129/93 of ECKART WERKE;
**Lamellar Aluminium in the form of an approximately 70% paste in DPG: CHROMAL VIII ® of ECKART WERKE.
***MoO₃: POR from CLIMAX Company
REMCOPAL ®: nonionic surfactants.

It should be noted that the molybdenum oxide powder was each time introduced into the GEOMET® or DACROMET® bath by dusting. The bath was homogenized by stirring using a dispersive blade at 450 revolutions per minute.

The anti-corrosion compositions tested were applied to 10 cm×20 cm cold rolled low carbon steel panels by coating using the Conway bar, followed by predrying at 70° C. during about 20 minutes, and then cured in an oven at 300° C. for 30 minutes.

In the case of application to screws, the compositions were applied by dip-spinning and then cured under the same conditions as for the panels.

The observed salt spray resistance results according to the ISO 9227 standard are given schematically in the following table:

TABLE 4

| PRODUCT | SUBSTRATE | Coating weight** | Salt spray resistance* Without MoO₃ | Salt spray resistance* With 2% MoO₃ |
| --- | --- | --- | --- | --- |
| Aqueous GEOMET ® | Panels | 32 | 288 | >840 |
| Aqueous GEOMET ® | Screws | 30 | 144 | 504 |
| DACROMET ® | Screws | 24 | 600 | 744 |

*Number of hours of exposure to salt spray before red rust appears.
**grams per square meter of coated surface, the thickness of the coatings are comprised between approximately about 6 μm and about 8 μm.

It is therefore apparent that introducing molybdenum oxide MoO₃ into compositions in aqueous phase, GEOMET® or DACROMET® containing particulate zinc, improves the salt spray resistance of the said compositions very substantially.

Another aspect of the invention consists in adding an alkaline silicate to the composition in an amount comprised between 0.05% to 0.5% by weight.

The addition of alkaline silicate, for example sodium silicate, surprisingly enhances the film cohesion in a worthy way.

This is particularly illustrated in the following comparative example given in Table 5.

EXAMPLE 3

In this example, the cohesion is evaluated by applying a transparent adhesive paper on the coating surface and by quick pulling off. The cohesion is evaluated according to a scale from 0 (complete pulling off of the coating film) to 5 (no pulling off at all of the coating film).

TABLE 5

| Raw materials | Composition without silicate (concentrations in %) | Composition with silicate (concentrations in %) |
| --- | --- | --- |
| Deionized water | 38.13 | 37.96 |
| Dipropylene glycol | 10.08 | 10.08 |
| Boric acid | 0.64 | 0.64 |
| Sympéronic NP4 ® | 1.48 | 1.48 |
| Sympéronic NP9 ® | 1.61 | 1.61 |
| Silane A187 ® | 8.47 | 8.47 |
| Zinc 31129/93 | 31.48 | 31.48 |
| Aluminium CHROMAL VIII ® | 4.98 | 4.98 |
| Schwegofoam ® | 0.21 | 0.21 |
| NIPAR S10 ® | 0.7 | 0.7 |
| AEROSOL TR70 ® | 0.52 | 0.52 |
| MoO₃ | 1 | 1 |
| Silicate of sodium grade 42 | 0 | 0.17 |
| Xanthan gum (1) | 0.7 | 0.7 |

(1) Thickening agent in order to control the viscosity of the composition during application The composition is applied onto steel panels which have previously been degreased, with a Conway rod, in order to obtain a weight of a coating layer of 30 g/m². The plates are then cured under the same conditions as previously described.

They are then submitted to the salt spray test according to ISO 9227 and to the cohesion test. The results are shown in following Table 6.

TABLE 6

| | Without alkaline silicate | With alkaline silicate |
| --- | --- | --- |
| Salt spray (number of hours before appearance of red rust) | 694 | 720 |
| Cohesion | 1/5 | 5/5 |

This table shows that even if the resistance to the cohesion is not significantly modified, the cohesion on the contrary, is highly improved.

The invention claimed is:

1. An aqueous anti-corrosion coating composition for metal parts, which composition comprises
    at least one particulate metal;
    an organic solvent;
    a thickener;
    a silane-based binder;
    molybdenum oxide; and
    water.

2. The anti-corrosion coating composition of claim 1, which composition contains from 0.5% to 7% by weight of molybdenum oxide.

3. The anti-corrosion coating composition of claim 2, which composition contains approximately 2% by weight of molybdenum oxide.

4. The anti-corrosion coating composition of claim 1, which composition contains from 10% to 40% by weight of the at least one particulate metal.

5. The anti-corrosion coating composition of claim 1, in which said particulate metal is chosen from lamellar zinc and/or lamellar aluminum.

6. The anti-corrosion coating composition of claim 5, in which said particulate metal comprises lamellar zinc.

7. The anti-corrosion coating composition of claim 1, in which composition the organic solvent is a glycolether.

8. The anti-corrosion coating composition of claim 7, in which composition the organic solvent is diethylene glycol, triethylene glycol, or dipropylene glycol.

9. The anti-corrosion coating composition of claim 1, which composition contains from 0.005% to 2% by weight of the thickener.

10. The anti-corrosion coating composition of claim 9, in which thickener is a cellulose derivative.

11. The anti-corrosion coating composition of claim 10, in which thickener is hydroxymethylcellulose, hydroxypropylcellulose, or hydroxypropylmethylcellulose.

12. The anti-corrosion coating composition of claim 9, in which the thickener is xanthan gum or a polyurethane or acrylic thickener.

13. The anti-corrosion coating composition of claim 1, which composition contains from 3% to 20% by weight of silane, as the silane-based binder.

14. The anti-corrosion coating composition of claim 13, in which composition the silane comprises γ-glycidoxypropyltrimethoxysilane.

15. The anti-corrosion agent of claim 1, in which composition the silane-based binder carries epoxy functional groups.

16. The anti-corrosion coating composition of claim 1, in which composition the organic solvent contains up to approximately 10% by weight of white spirit.

17. The anti-corrosion coating composition of claim 1, which composition contains a silicate of sodium, potassium, or lithium.

18. The anti-corrosion coating composition of claim 1, which composition contains approximately 30% to 60% by weight of water.

* * * * *